United States Patent Office 3,843,320
Patented Oct. 22, 1974

3,843,320
GRAFT POLYMERIZATION OF VINYL MONOMERS ONTO CHROME-TANNED HIDES AND SKINS
Stephen H. Feairheller, Wyndmoor, Alfred H. Korn, Maple Glen, Edward H. Harris, Jr., North Wales, and Edward M. Filachione and Maryann M. Taylor, Philadelphia, Pa., assignors to the United States of America as represented by the Secretary of Agriculture
No Drawing. Filed May 31, 1972, Ser. No. 258,279
Int. Cl. C14c *11/00, 3/06*
U.S. Cl. 8—94.21                                    8 Claims

ABSTRACT OF THE DISCLOSURE

Vinyl monomers are graft polymerized onto chrome-tanned animal hides and skins by mixing for about thirty minutes in the absence of atmospheric oxygen chrome-tanned hides or skins with an emulsifying agent and an initiator and then adding an appropriate amount of monomer or mixture of monomers and mixing again in the absence of atmospheric oxygen until polymerization is complete. This process imparts to leather some of the beneficial properties of synthetic polymers while retaining the desirable properties of leather.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to the graft polymerization of vinyl monomers onto chrome-tanned animal hides and skins using ceric ion or a persulfate/bisulfite redox system as initiator and more particularly to successful carrying out this type of graft polymerization without adversely affecting the desirable properties of leather in the chrome-tanned hides and skins while imparting other beneficial properties to the leather.

Although leather is a versatile material and is still the preferred material for shoemaking it lacks some desirable properties. Unlike many synthetic substitutes, leather lacks uniformity and is subject to chemical deterioration, water penetration and abrasion damage. Some of these deficiencies are overcome by impregnating or coating leather with various preformed polymers. Unfortunately these treatments are not permanent because the polymers are only deposited in or on the leather and are not covalently attached. In fact, occasionally such treatment obviates some of the desirable properties of leather.

Although coating leather with a preformed polymer imparts a synthetic look to the product, in many cases it severely reduces the water vapor permeability of the leather. This is also a problem when leather is impregnated with the preformed polymer.

An alternative method of imparting to leather the desirable properties of the synthetic substitutes is graft polymerization of various monomers to the hide substance prior to chrome tanning. However, there are disadvantages to this process because the nature of the grafted polymer predetermines to a large extent some of the properties of the final product and necessitates separating the stock prior to chrome-tanning. Also, the grafted synthetic polymer interferes with the subsequent chrome-tanning of the leather.

Although the application of graft polymerization to cotton, starch, cellulose, wool, collagen and hide materials has been previously investigated and vinyl monomers have been grafted onto proteins including collagen and wool, no prior art is known regarding graft polymerization onto chrome-tanned collagen. In fact, one skilled in the art having a knowledge of the factors involved, that is, that the ceric ion and the persulfate in the redox system are active oxidizing agents and the chromium III ions are capable of being oxidized, would expect the initiators to be incompatible with the chromium in the chrome-tanned stock thus negating any possibility of graft polymerizing a vinyl monomer to chrome-tanned leather.

Therefore, it an object of this invention to improve the properties of leather by imparting to leather some of the beneficial properties of synthetic polymers while retaining the desirable properties of natural leather.

Another object is to increase the strength and elastic properties of leather, particularly the grain.

Still another object is to upgrade leather by filling in the open areas thus increasing its cutting value.

A further object is to upgrade leather by producing a grain character having the more uniform and finer break characteristics found in high quality full grain aniline finish leather.

A still further object is to upgrade leather by eliminating some of the defects inherent in low quality leather such as veinness, pulpy butts, and doublehidedness.

According to this invention the above objects are accomplished by mixing for about 30 minutes in the absence of atmospheric oxygen chrome-tanned hides or skins with an emulsifying agent and a polymerization initiator wherein the emulsifying agent is preferably selected from the group consisting of

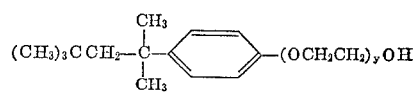

wherein $y$ is a number from 5 to 12;

$$CH_3(CH_2)_nN[(CH_2CH_2O)_mH]_2$$

wherein $n$ is a number from 15 to 20 and $m$ is a number from 5 to 10; and

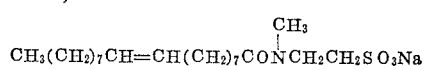

and the preferred initiator is the redox system of potassium persulfate and sodium bisulfite, adding an appropriate amount of monomer or mixture of monomers preferably selected from the group consisting of acrylic acid, butyl acrylate, ethyl acrylate, ethylhexyl acrylate, methyl methacrylate, butyl methacrylate, acrylonitrile, styrene and methacrylic acid and mixing again in the absence of atmospheric oxygen until polymerization is complete.

The process of this invention, graft polymerization of various vinyl monomers onto chrome-tanned animal hides and skins, imparts a variety of properties on the hides and skins that are related to the properties of the respective homopolymer. Performing the polymerization in the hides and skins after chrome-tanning is advantageous because up to that point the processing steps are about the same for all types of leather and since this is almost the last step in wet-processing, the grafted polymer will not interfere with tanning since the hide is already tanned. Also, it is at this point that hides and skins are sorted and the decision made as to what type of leather will finally be made. This allows the tanner to impart those properties he desires in his final product at this early stage of processing and eliminate several later steps such as coating or impregnating the leather with a preformed polymer.

In the process of this invention a chrome-tanned hide or skin is placed in a solution consisting of water, a surfactant-emulsifier, preferably of the octyl phenoxy polyethoxy ethanol class such as Triton X-100 or Triton X-45, potassium persulfate and sodium bisulfite. Dry Ice is then added in an amount sufficient to displace all of the air with $CO_2$ as it sublimes, the container is sealed and the contents thoroughly mixed for ½ hour. The appropriate amount of monomer or mixture of monomers is then added, additional Dry Ice is added, the container is resealed and the contents thoroughly mixed until polymerization is complete. The spent liquid phase is discarded and the hide or skin washed with water until free of unused reactants or byproducts. Our processing was generally done at room temperature. However, the process can be conducted over a wide range of temperatures, for example, from 0° to 100° C. In fact, a preferred embodiment of the invention is to begin the graft polymerization at a relatively low temperature, 0–20° C., and then elevate the temperature to about 50–75° C. to complete the polymerization process.

The chrome-tanned hides and skins are used in the wet, drained condition and the amounts of reagents are based on the amount of dry chrome-tanned hide substance actually used. These hides and skins usually consist of about 75% water, thus there is roughly a factor of four between their wet weight and their dry weight.

For the purposes of this invention we have used only acrylic and methacrylic acid and derivatives (esters, nitrile) and styrene. However, any vinyl type monomer can be used in this invention. These include vinyl esters, isopropenyl ester, vinyl halides, vinylidene halides, tetrafluoroethylene, itaconic acid and derivatives, fumaric acid and derivatives, maleic acid and derivatives, alkylaminoalkyl acrylates, vinyl pyridines and vinyl pyrrolidone. The monomers can be used in the range of 1–100% of the dry weight (or 0.25–25% of the wet weight) of the chrome-tanned hides and skins. Of course, the more monomer used, the more it imparts the properties of its polymer on the final product. At least 20% monomer is needed to give a product with any noticeable differences in properties. This gives a final product that is about 17% synthetic polymer.

We used potassium persulfate and sodium bisulfite as the redox (reduction activated) system for initiation of the polymerization. However, any redox system, comprising a reducing agent and an oxidizing agent that interact to produce free radicals, may be used. Relative to each other, on a weight basis, one part of sodium bisulfite is used for every three parts of potassium persulfate. A minimum of 2% of potassium persulfate based on the dry weight of the hide substance is required. For loadings of monomer higher than 20% (same basis), more reliable results are obtained when 4% of potassium persulfate is used. Amounts higher than 4% reduces the percentage of synthetic polymer grafted.

Although the nonionic surfactant emulsifiers of the octyl phenoxy polyethoxy ethanol class are preferred, other emulsifying agents can be used. These include the alkylaryl polyether alcohols, polyoxyethylene sorbitan monopalmitate, sodium N-methyl-N-oleoyltaurate and some of the tertiary amines. The amount of emulsifying agent used should be at least 2% by weight of the monomer. Four to five percent is preferred.

The amount of water used in the process is not critical, but a preferred amount is 5 to 10 times the dry weight of the hide material.

Any inert gas may be used to exclude air and protect the reaction mixture from atmospheric oxygen. Both nitrogen and carbon dioxide work well but $CO_2$ was chosen because it can be added in the form of a solid (Dry Ice) and it sweeps the oxygen out of the system more efficiently because it is heavier than air.

As for time of reaction, it is only necessary that sufficient time be allowed for polymerization to take place. There is, of course, the natural period of inhibition which is common to all free radical polymerization reactions. We have found it advantageous to allow a maximum of thirty minutes for the redox initiating system to react with the chrome-tanned hide or skin before adding the

TABLE I

| Example No. | Wet wt. of stock (g.) | Water (ml.) | Surfactant trade name | G. | Potassium persulfate (g.) | Sodium bisulfite (g.) | Monomer and mixtures of monomers | G. | Total formed polymer (percent) | Total bound polymer (percent) |
|---|---|---|---|---|---|---|---|---|---|---|
| 1 | 101 | 202 | Triton X-100 [1] | 1.0 | 1.0 | .30 | EA [5] | 25 | 52 | 20 |
| 2 | 100 | 200 | do.[1] | 1.0 | .5 | .20 | BA [6] | 5 | 17 | 7 |
| 3 | 90 | 180 | do.[1] | .9 | .5 | .14 | BA [6] | 23 | 55 | 24 |
| 4 | 55 | 110 | Triton X-45 [2] | .6 | .3 | .08 | BA [6] | 14 | 47 | 18 |
| 5 | 42 | 84 | Ethomeen T-15 [3] | .4 | .2 | .06 | BA [6] | 11 | 44 | 13 |
| 6 | 42 | 84 | Igepon T-77 [4] | .4 | .2 | .06 | BA [6] | 11 | 38 | 15 |
| 7 | 78 | 156 | Triton X-100 [4] | .8 | .2 | .06 | BA [6] | 20 | 35 | 16 |
| 8 | 79 | 158 | do.[4] | .8 | 1.6 | .50 | BA [6] | 20 | 52 | 15 |
| 9 | 114 | 229 | do.[4] | 1.1 | 1.1 | .34 | EHA [7] | 29 | 28 | 6 |
| 10 | 86 | 172 | do.[4] | .9 | .9 | .26 | MMA [8] | 22 | 55 | 10 |
| 11 | 81 | 162 | do.[4] | .8 | .8 | .24 | BMA [9] | 20 | 16 | 4 |
| 12 | 43 | 86 | do.[4] | .4 | .4 | .13 | AN [10] | 11 | 47 | -- |
| 13 | 98 | 195 | do.[4] | 1.0 | 1.0 | .29 | S [11] | 24 | 53 | 21 |
| 14 | 86 | 172 | do.[4] | .9 | .9 | .26 | BA / MMA | 13 / 9 | 58 | 26 |
| 15 | 103 | 206 | do.[4] | 1.0 | 1.0 | .31 | BA / S | 11 / 11 | 48 | 20 |
| 16 | 55 | 111 | do.[4] | .6 | .6 | .16 | BA / An | 5 / 3 | 21 | -- |
| 17 | 50 | 100 | do.[4] | .5 | .5 | .15 | BA / AN | 3 / 5 | 11 | -- |
| 18 | 23 | 46 | do.[4] | .2 | .1 | .03 | BA / AA [12] | 2 / 0.2 | 33 | 30 |
| 19 | 37 | 74 | do.[4] | .4 | .2 | .07 | BA / AA | 5 / 0.7 | 32 | 29 |

[1] 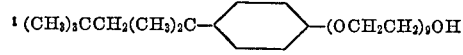

[2] 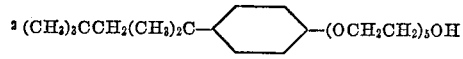

[3] $CH_3(CH_2)_nN[(CH_2CH_2O)_mH]_2$ wherein $n$ is 15 to 20 and $m$ is 5 to 10.

[4] 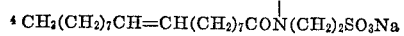

[5] EA = ethyl acrylate.
[6] BA = butyl acrylate.
[7] EHA = ethylhexyl acrylate.
[8] MMA = methyl methacrylate.
[9] BMA = butyl methacrylate.
[10] AN = acrylonitrile.
[11] S = styrene.
[12] AA = acrylic acid.

monomer. With the thirty minute delay, we obtained maximum levels of total polymer formed and of the amount grafted onto the hide.

Some of the results obtained by the practice of this invention are shown in Table I.

We claim:

1. A process for graft polymerizing a vinyl monomer onto a chrome-tanned hide, comprising the following steps:
    (a) placing in a container a chrome-tanned hide in wet, drained condition and a solution containing water, a surfactant-emulsifier, and a redox polymerization initiator system consisting of potassium persulfate and sodium bisulfite;
    (b) adding to the mixture of step (a) sufficient Dry Ice to displace all the air in the container with $CO_2$;
    (c) sealing the container and mixing the contents for about 30 minutes;
    (d) adding to the mixed contents described in step (c) a monomer selected from the group consisting of acrylic acid, butyl acrylate, ethyl acrylate, ethylhexyl acrylate, methyl methacrylate, butyl methacrylate, acrylonitrile, styrene, methacrylic acid and mixtures thereof;
    (e) adding to the mixture described in step (d) sufficient Dry Ice to again displace the air in the container with $CO_2$;
    (f) resealing the container; and
    (g) mixing the contents of the container as described in step (e) until polymerization of the monomer is complete and up to 30% of the formed polymer is graft copolymerized to the chrome-tanned hide.

2. The process of Claim 1 wherein the monomer is ethyl acrylate.

3. The process of Claim 1 wherein the monomer is butyl acrylate.

4. The process of Claim 1 wherein the monomer is styrene.

5. The process of Claim 1 wherein the monomers are a mixture of butyl acrylate and acrylic acid.

6. The process of Claim 1 wherein the monomers are a mixture of butyl acrylate and methyl methacrylate.

7. The process of Claim 1 wherein the emulsifying agent is selected from the group consisting of

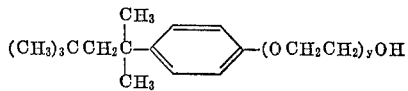

wherein $y$ is a number from 5 to 12;

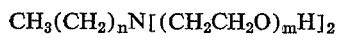

wherein $n$ is a number from 15 to 20 and $m$ is a number from 5 to 10; and

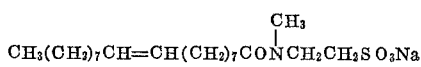

8. The process of Claim 7 wherein the emulsifying agent is

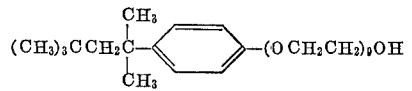

References Cited

UNITED STATES PATENTS

| | | | |
|---|---|---|---|
| 3,291,558 | 12/1966 | Bader et al. | 8—94.21 |
| 3,083,118 | 3/1963 | Bridgeford | 8—Dig. 18 |
| 3,236,923 | 2/1966 | Degering | 8—Dig. 18 |

FOREIGN PATENTS

| | | | |
|---|---|---|---|
| 720,505 | 12/1954 | Great Britain | 8—Dig. 18 |

LEON D. ROSDOL, Primary Examiner

H. WOLMAN, Assistant Examiner

U.S. Cl. X.R.

8—94.27; 117—142